United States Patent
Dione (10) Patent No.: US 11,468,457 B2
(45) Date of Patent: Oct. 11, 2022

(54) LOGISTIC DEMAND FORECASTING

(71) Applicant: Accenture Global Solutions Limited, Dublin (IE)

(72) Inventor: Diegane Dione, Brooklyn, NY (US)

(73) Assignee: Accenture Global Solutions Limited, Dublin (IE)

( * ) Notice: Subject to any disclaimer, the term of this patent is extended or adjusted under 35 U.S.C. 154(b) by 632 days.

(21) Appl. No.: 15/933,743

(22) Filed: Mar. 23, 2018

(65) Prior Publication Data

US 2018/0276695 A1    Sep. 27, 2018

Related U.S. Application Data

(60) Provisional application No. 62/476,305, filed on Mar. 24, 2017.

(51) Int. Cl.
| | |
|---|---|
| *G06Q 30/02* | (2012.01) |
| *G06Q 10/08* | (2012.01) |
| *G06N 20/00* | (2019.01) |
| *G06N 20/10* | (2019.01) |
| *H04W 4/14* | (2009.01) |
| *G06K 9/62* | (2022.01) |
| *G06F 40/205* | (2020.01) |
| *G06V 30/10* | (2022.01) |

(52) U.S. Cl.
CPC ......... *G06Q 30/0202* (2013.01); *G06N 20/00* (2019.01); *G06N 20/10* (2019.01); *G06Q 10/08* (2013.01); *G06F 40/205* (2020.01); *G06K 9/6269* (2013.01); *G06V 30/10* (2022.01); *H04W 4/14* (2013.01)

(58) Field of Classification Search
CPC .................................................. G06Q 30/0202
See application file for complete search history.

(56) References Cited

U.S. PATENT DOCUMENTS

| | | | |
|---|---|---|---|
| 2005/0091100 A1* | 4/2005 | Riggs | G06Q 30/00 705/7.26 |
| 2007/0124009 A1 | 5/2007 | Bradley et al. | |
| 2008/0293480 A1 | 11/2008 | Moreno | |
| 2009/0313101 A1* | 12/2009 | McKenna | G06Q 30/0224 705/14.25 |
| 2011/0071885 A1* | 3/2011 | Ayres de Castro | G06Q 30/02 705/7.31 |

(Continued)

*Primary Examiner* — Nadja N Chong Cruz
(74) *Attorney, Agent, or Firm* — Fish & Richardson P.C.

(57) ABSTRACT

Implementations directed to providing a computer-implemented system for providing a logistic demand forecasting comprising receiving a plurality of electronic receipts, each electronic receipt comprising a plurality of logistic data elements, parsing the electronic receipts to aggregate the logistic data elements, processing the aggregated logistic data elements through a logistics demand forecasting analytics model, the logistics demand forecasting analytics model having been trained using a set of training data describing historic and actual demand within a logistic supply chain, determining a logistic demand forecasting based on the processing, the logistic demand forecasting indicating an upcoming demand for transportation assets within the logistic supply chain, and providing the logistic demand forecasting to an automated warehouse system servicing the logistic supply chain.

17 Claims, 5 Drawing Sheets

(56) References Cited

U.S. PATENT DOCUMENTS

| | | | |
|---|---|---|---|
| 2013/0204663 A1* | 8/2013 | Kahlow | H04L 67/22 |
| | | | 705/7.31 |
| 2015/0317589 A1* | 11/2015 | Anderson | G06N 7/005 |
| | | | 705/7.25 |
| 2015/0317598 A1* | 11/2015 | Stowe | G06Q 10/083 |
| | | | 705/330 |
| 2017/0124633 A1* | 5/2017 | Natarajan | G06Q 30/0635 |

* cited by examiner

LOGISTIC DEMAND FORECASTING

CROSS-REFERENCE TO RELATED APPLICATION

This application claims the benefit under 35 U.S.C. § 119(e) of U.S. Patent Application No. 62/476,305, entitled "Logistic Demand Forecasting," filed Mar. 24, 2017, which is incorporated herein by reference in its entirety.

BACKGROUND

In view of the growth of electronic marketplaces and subscription business models as well as consumer-packaged goods ("CPG"), companies seeking to sell directly to customers are rapidly increasing the number of deliveries fulfilled by logistics companies. To keep pace with this demand, supply chains must have the flexibility to fulfill orders from stock locations that best suits the needs of customers and retailers. This increase in the number of deliveries and stock locations that are flexible for fulfillment has put transportation costs under pressure. Consequently, logistics companies face a challenge in predicting the number of transportation assets, such as moving truck and trailers, and personnel to allocate throughout the season and during peak holiday seasons.

SUMMARY

Implementations of the present disclosure are generally directed to providing demand forecasting within a logistic supply chain. More specifically, implementations are directed to an engine that employs a machine learning algorithm to determine a logistic demand forecasting for a logistics company or an internal logistics department based on electronic receipt (e-receipt) data received and processed in real-time, near real-time, or periodically.

In some implementations, actions include receiving a plurality of e-receipts, where each electronic receipt includes logistic data elements, parsing the e-receipts to aggregate the logistic data elements, processing the aggregated logistic data elements through a logistics demand forecasting analytics model, the logistics demand forecasting analytics model having been trained using a set of training data including historic and actual demand within a logistic supply chain, determining a logistic demand forecasting based on the processing, the logistic demand forecasting indicating an upcoming demand for labor or transportation assets within the logistic supply chain, and providing the logistic demand forecasting to an automated warehouse system servicing the logistic supply chain. Other implementations of this aspect include corresponding systems, apparatus, and computer programs, configured to perform the actions of the methods, encoded on computer storage devices.

These and other implementations can each optionally include one or more of the following features: the logistics demand forecasting analytics model is trained with a supervised machine-learning algorithm; the e-receipts are received from an electronic mail provider, an Internet of Things (IoT) device, a cross-platform messaging and Voice over IP (VoIP) service (e.g. WhatsApp, Facebook Messenger, Skype, Viber) and/or a short message service (SMS) provider; the logistic demand forecasting indicates an upcoming demand for labor and transportation assets within the logistic supply chain; the logistic demand forecasting is determined based on data received from a social media provider, a web search provider, a television (TV) set-top box (STB) data provider, a credit and debit provider, data aggregator and services provider, data aggregator and services provider, or an Automated Clearing House (ACH) data provider; the logistics demand forecasting analytics model is trained with a decision tree classifier, a neural network classifier, or a support vector machine (SVM) classifier.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Logistics companies face a challenge in predicting the number of transportation assets and personnel (e.g. part-time workers) to allocate throughout the year. This is particularly challenging during the peak holiday season, and/or during unexpected spikes or dips in shipment demand. The continued growth of electronic commerce (ecommerce) is stretching capacity, which has caused a significant growth in "Purchased Transportation" (e.g., the hiring of independent contractors). When a purchase is made online, the respective ecommerce provider/retailer may not send the relevant information to a logistics company (or an internal logistics department) right away. As such, there may be a time lag of a few hours or days before the ecommerce provider notifies the logistics company about the shipment to be picked up from a warehouse or distribution center for delivery.

Logistics companies can benefit from knowing about the shipment demand and requirements as soon as purchases are made to allow for increased accuracy and precision in forecasting upcoming asset and labor needs. Additionally, the total quantity of orders being shipped from a specific ecommerce retailer and the total amount of shipping and handling cost for that specific retailer can be used by a logistics company to offer incentives to the ecommerce retailer to use its services versus other logistics companies.

In view of the foregoing, implementations of the present disclosure are generally directed to a computer-implemented service for providing a logistic demand forecasting to logistics companies. The logistic demand forecasting provides for increased accuracy regarding asset and labor projection, and is determined based on multiple data sources with highly relevant data points. Example data sources include e-receipts, and are received and processed in real-time, near real-time or periodically, and can be combined with internal data and traditional data sources.

Figure 1:
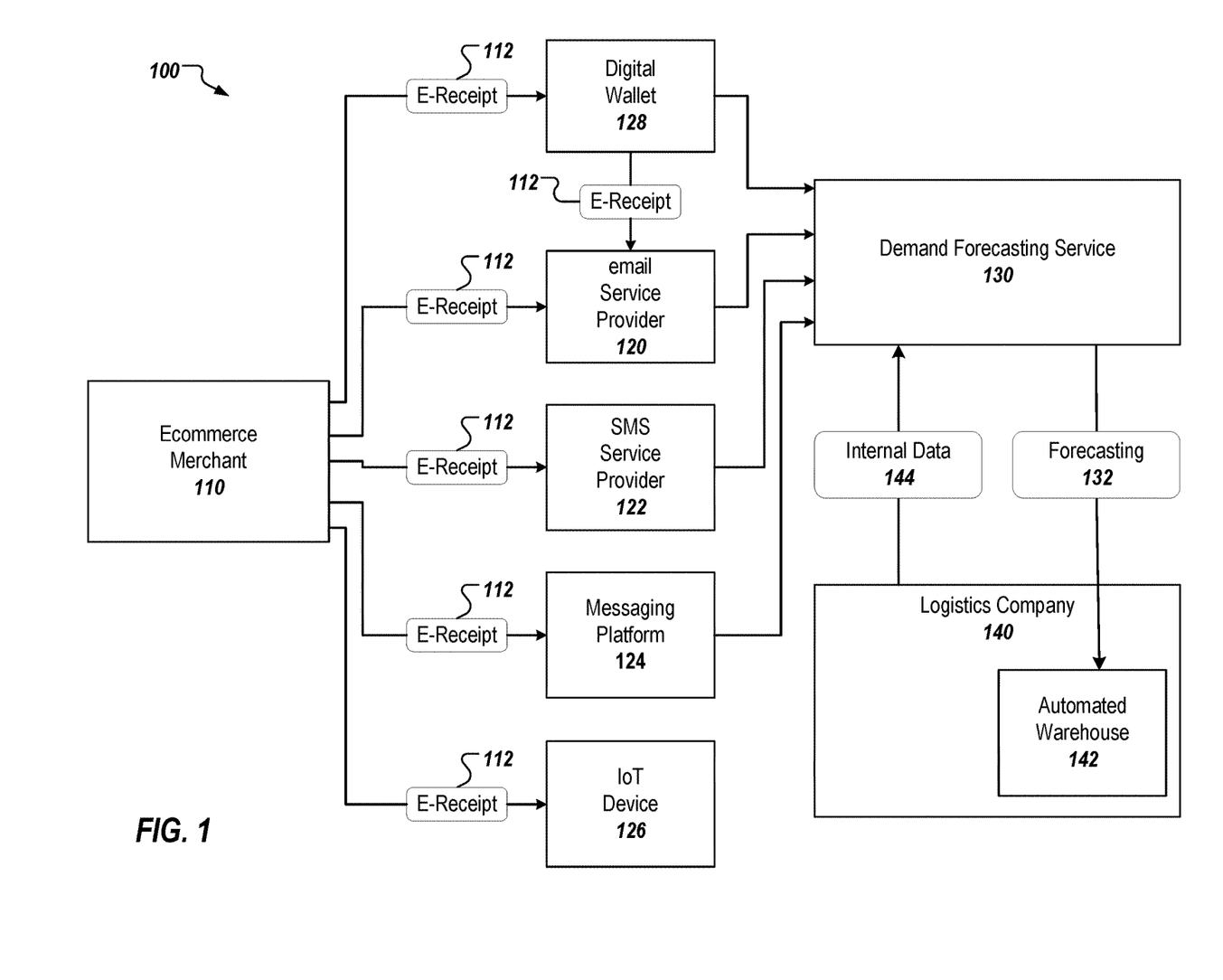
FIG. 1 depicts an example system for providing a logistic demand forecasting, according to implementations of the present disclosure.

FIG. 1 depicts an example system 100 for providing a logistic demand forecasting, according to implementations of the present disclosure. The example system 100 includes ecommerce merchant(s) 110, electronic mail (email) service provider(s) 120, SMS provider(s) 122, messaging platform 124, IoT device(s) 126, digital wallet(s) 128, demand-forecasting service 130, and logistics company(ies) 140. The components of the system 100 may communicate via a network that includes a local area network (LAN), a wide area network (WAN), the Internet, or a combination thereof, which can be accessed over a wired and/or wireless communications link(s). In the depicted example, the components of the system 100 may be hosted using one or more computing device(s) of any suitable number and type of computing device. Configuration of such computing devices include shared, virtual, managed/dedicated, cluster/grid, cloud based resources, and/or any combination thereof.

In the depicted example, ecommerce merchant(s) 110 is a firm or individual who conducts business over an electronic network, such as the Internet. Ecommerce merchant(s) 110 provides products and/or services via ecommerce and may operate in all four of the major market segments: business-to-business, business-to-consumer, consumer-to-consumer, and consumer-to-business. Example ecommerce providers include Amazon and the eBay marketplace. When a customer purchases goods and/or services from ecommerce merchant(s) 110, an e-receipt, such as e-receipt or e-receipt data 112, may be generated and sent to the customer in real-time or near real time. Furthermore, in accordance with implementations of the present disclosure, e-receipts may also be generated and sent to the customer in real-time or near real time when a customer purchase goods and/or services at a tradition brick and mortar stores. For example, an e-receipt may be generated and sent when a customer requests to have a product that is purchased at a brick and mortar store delivered to a physical address. In accordance with implementations of the present disclosure, real-time describes actions that can be executed without any intentional delay, taking into account the processing limitations of the example system 100 and any time required to process data.

An e-receipt is an electronic document acknowledging the purchase of a specified amount of money, goods, etc., which may be sent electronically through, for example, email, a messaging platform, or SMS. An e-receipt may include logistic data elements, which comprise information and/or metadata associated with a sale including, for example, the date and time of the purchase, how payment was made, shipping information (e.g. street, city, state, zip code), information regarding the purchased product and/or service (e.g., category, Stock Keeping Unit (SKU) number, product serial number), shipping speed, information regarding the ecommerce provider, the logistics company, and so forth.

E-receipts 112 may be sent to respective customers by ecommerce merchant(s) 110 through various electronic messaging providers, such as email service provider(s) 120, SMS provider(s) 122, and/or messaging platform 124. The messaging service provider that the ecommerce merchant(s) 110 employs to deliver an e-receipt 112 may depend on, for example, the respective customer's setting(s) or profile. For example, e-receipt 112 may be sent as an email message by ecommerce merchant(s) 110. An email is an electronic message that employs multiple protocols within the Transmission Control Protocol/Internet Protocol (TCP/IP) suite for message delivery. For example, Simple Mail Transfer Protocol (SMTP) is employed by email servers and email service providers, such as email service provider(s) 120, to send and receive messages, while the Post Office Protocol (POP) or Internet Message Access Protocol (IMAP) are used to retrieve messages from a mail server. Additionally, email messages support plain and rich text as well as Hypertext Markup Language (HTML) within a message payload. Email messages may be delivered through email service provider(s) 120. An email service provider (e.g., mailbox provider, mail service provider) is an entity that provides email hosting by implementing email servers to send, receive, accept, and store email for other organizations and/or end users, on their behalf. An email service provider may provide a web site front end to allow user to access their respective email boxes. Additionally, an email service provider may provide users access to their respective email boxes via the aforementioned protocols, POP and IMAP. Email service providers include, for example, Gmail, Zoho Mail, Yahoo! Mail, Outlook.com, and Mail.com.

E-receipt 112 may also be sent in an SMS message by ecommerce merchant(s) 110. SMS is a text messaging service component of many telephone, World Wide Web, and mobile telephony systems. SMS employs standardized communication protocols to enable devices to exchange short text messages. SMS messages may be delivered through SMS provider(s) 122. An SMS service provider is an entity that provides SMS messaging services and may act as an intermediary between mobile network operators and SMS service users. For example, an SMS service provider may sign agreements with mobile network operators to obtain permission to exchange SMS messages through the respective mobile networks and offer an interface for users to send and receive SMS messages. An SMS service provider may also provide an SMS gateway(s) to/from which users may send and receive SMS messages. Many wireless services providers, such as AT&T, Sprint, Verizon, and T-Mobile, also serve as SMS service providers. Other example SMS service providers include groupme, kik, and Google Voice.

In some example, messaging platforms 124 are employed by ecommerce merchant(s) 110 to send the e-receipt 112. Messaging platforms 124 include application and platforms that enable cross-platform messaging as well as Voice over IP (VoIP). Example providers of messaging platforms 124 includes WhatsApp™, Facebook Messenger™, Skype™, and Viber™

The IoT is the inter-networking of physical devices, vehicles, buildings, and other items embedded with electronics, software, sensors, actuators, and network connectivity that enable these objects to collect and exchange data. IoT devices, such as IoT device(s) 126, are any nonstandard computing device that connects wirelessly to a network and have the ability to transmit data. Such IoT devices serve as the "things" in the IoT. Example IoT devices include cars as well as home, personal, or office devices, such as thermostats, light bulbs, door locks, fridges, cars, implants for RFID, and pacemakers.

In the depicted example, IoT device(s) 126 may be commerce enabled to make purchases autonomously from ecommerce merchant(s) 110. Commerce-enabled IoT devices may include an embedded system that replicates the actions of a human interacting with an ecommerce platform of an ecommerce provider, such as ecommerce merchant 110. When an order is received, ecommerce merchant 110 may generate and send e-receipt 112 to IoT device(s) 126. In some implementations, IoT device(s) 126 may share a received e-receipt 112 with other IoT devices that are owned by logistics companies or third parties. The IoT devices owned by Logistics companies or third parties may be located, for example in transportation assets, such as moving trucks and trailers, or in fixed locations, such as a store or a physical mailbox. Transportation assets can also include unmanned systems, such as aerial drones and autonomous vehicles.

Digital wallet(s) 128 is an electronic device or application that allows individuals to make electronic transactions, such as an on-line purchase or using a smartphone to purchase something at a store. Example Digital Wallet providers include Apple Pay, Android Pay, and MasterPass. An individual's bank account and/or credit cards can be linked to the digital wallet. Additionally, user information, such as driver's license information, insurance card(s), loyalty card(s), and other identification documents, may be stored within the digital wallet. In some implementations, a user's credentials can be passed to a merchant's terminal wirelessly via near field communication (NFC). In the depicted example, digital wallet(s) 128 may be employed to purchase goods and/or services from ecommerce merchant(s) 110. When an order is received, ecommerce merchant 110 may generate and send e-receipt 112 to the respective digital wallet 128 through which the order was placed. Additionally, when digital wallet(s) 128 makes a purchase, the digital wallet may generate an e-receipt 112. The received and/or generated e-receipt 112 is stored by the respective digital wallet and/or sent to the customer's email address through an email service provider, such as email service provider(s) 120.

Logistics company 140 is an entity that provides the transportation and/or management over the flow of goods and materials between points of origin to the end-use destination. Logistics company 140 may handle transportation, shipping, inventory, warehousing, packaging, and security functions for shipments. Example logistic entities include United Parcel Service (UPS), FedEx, United States Postal Service (USPS), DHL, and the internal logistics department of a company, such as (but not limited) to an internal logistics department of a manufacturer, ecommerce retailer, brick & mortar retailer, wholesaler and or distributor.

Figure 2:
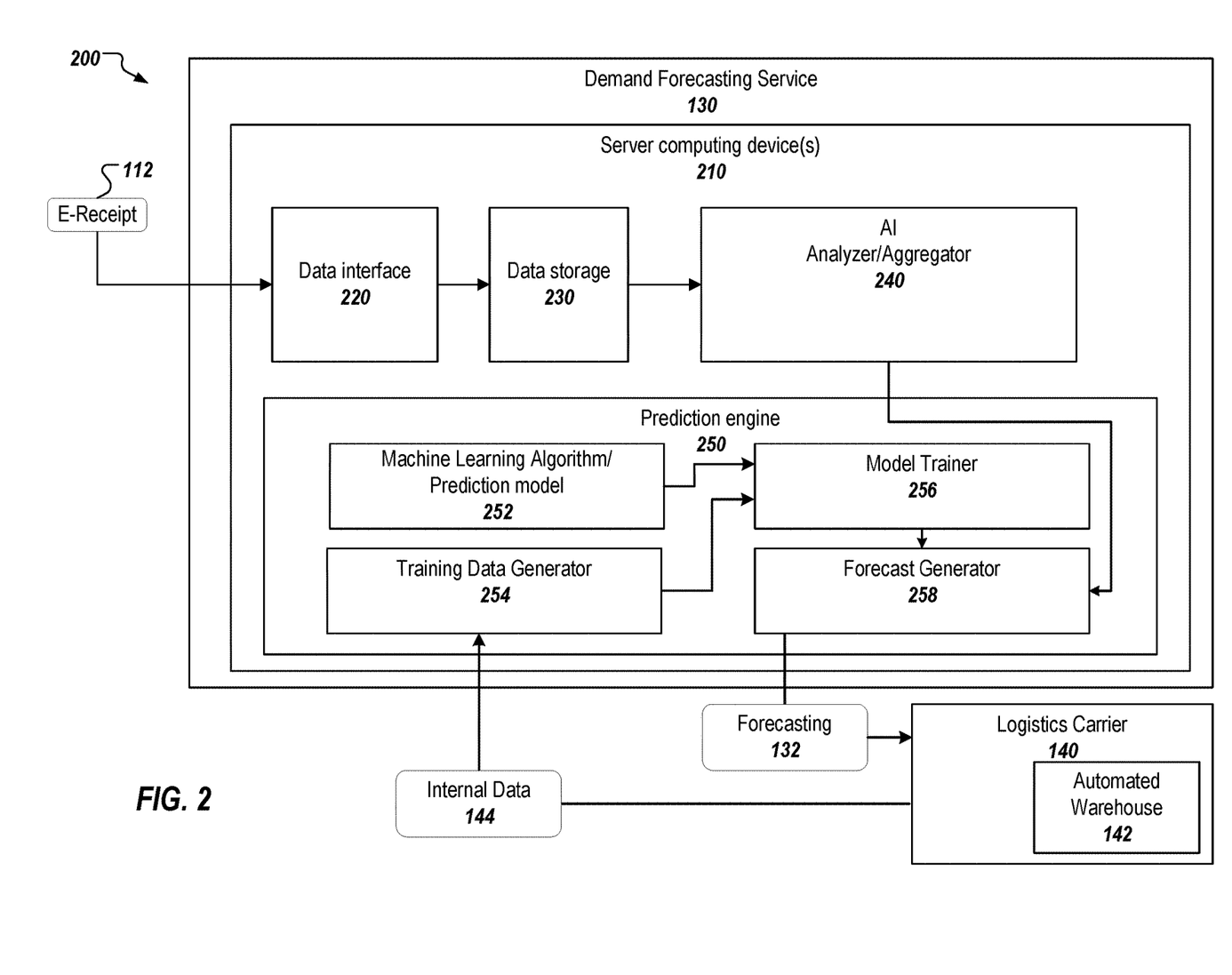
FIG. 2 depicts an example engine for providing a logistic demand forecasting, according to implementations of the present disclosure.

Logistics company 140 may employ automated warehouse 142. An automated warehouse is a facility where tasks related to shipping, storing, retrieving, and moving inventory are carried out by a variety of computer-controlled systems. In some implementations, automated warehouse 142 may be controlled and/or owned by logistics company 140 as depicted in FIG. 1 and FIG. 2. In other implementations automated warehouse 142 may be controlled and/or owned by a manufacturer or third party.

Demand forecasting service 130 is a service that aggregates logistic data to forecast demand, which may be used to identify and/or predict demand spikes or dips. Forecasts may be updated on a predetermined frequency in real-time, near real-time or periodically, such as hourly or daily. Forecasts can be utilized by logistics companies to, for example, allocate assets to transport goods and provide services. In some implementations, demand-forecasting service 130 is controlled and/or hosted by a respective logistics company. In other implementations, demand-forecasting service 130 is controlled and/or hosted by a third party, such as Accenture PLC.

In the depicted example, demand-forecasting service 130 receives e-receipt data 112 from a variety of sources, such as email service provider(s) 120, SMS service provider(s) 122, messaging platforms 124, IoT device(s) 126, and digital wallet(s) (or digital wallet providers) 128. Demand forecasting service 130 may receive e-receipt data 112 directly from commerce enabled IoT devices or from IoT devices that are owned by logistics companies or third parties that have received the information from commerce enabled IoT devices, as described previously.

In some implementations, the demand-forecasting service 130 bi-directionally communicates with the IoT device(s) 126. The demand-forecasting service 130 may set up the bi-directionally communication with IoT device(s) 126 based on a subscription or having previously received e-receipt data. The bi-directional communication allows the demand-forecasting service 130 to, for example, periodically (e.g. every few minutes, couple of hours, once each day depending on the configuration) retrieve e-receipt data 112 for the IoT devices 126. For example, if an e-receipt data 112 transmission from the IoT device is not received by the demand-forecasting service 130, the periodic communication from the demand-forecasting service 130 provides another way for this information to be transmitted and received. Additionally, in a Connected Home or Connected Office environments, when an IoT device 126 is unsuccessful at connecting directly to the demand-forecasting service 130, such as when a cell network is down, the IoT device 126 may route the e-receipt to another IoT device(s) that may be able to transmit the e-receipt data 112 to the demand-forecasting service 130 successfully.

Relevant data elements are aggregated by demand-forecasting service 130 across multiple e-receipts 112 to generate summary information regarding upcoming shipment volumes. Example shipment volumes include the information and/or metadata associated with the sales captured within the respective e-receipts 112 including, for example, shipping information (e.g. street, city, state, zip code), information regarding purchased products and/or services (e.g., category, product serial number, and SKU), shipping speed, information regarding the ecommerce merchant, and the logistics company.

Logistics company 140 provides internal data 144 to demand-forecasting service 130. Internal data may include order history, external economic indicators, commodity prices, weather forecasts, inventory data, capacity data, and information from internal systems such as supply chain management systems, warehouse management systems, transportation management systems, and Accenture Freight and Logistics Software. The received internal data 144 is employed by demand-forecasting service 130 to train one or more prediction models. A machine learning algorithm(s) is applied to generate the logistic demand forecasting 132 with the use of the trained one or more predictive models and the generated summary information that is aggregated from the received e-receipts 112. Information from other data sources, such as credit and debit cards, search engines, Web cookies, TV STB data, social media, IoT Data, and so forth, may also be combined with the aggregated e-receipt data 112 to generate the logistic demand forecasting 132. The generation of logistic demand forecasting 132 by demand-forecasting service 130 is described in greater detail below in the description regarding FIG. 2.

In the depicted example, logistics company 140 receives the logistic demand forecasting data 132 from demand-forecasting service 130. In some implementations, logistics company 140 is able to receive the logistic demand forecasting data 132 in real-time, near real-time, periodically to adjust demand forecasting, resource allocations (e.g., personnel and transportation assets), and/or pricing. Logistics company 140 may feed the logistic demand forecasting data 132 directly to automated warehouse 142. Accordingly, the logistic demand forecasting data 132 may be employed by automated warehouse 142 to provide greater intelligence of inventory and/or resources planning in any associated physical warehouses.

FIG. 2 depicts an example system and engine 200 for demand-forecasting service 130, as shown in FIG. 1, according to implementations of the present disclosure. As shown in the example 200 of FIG. 2, demand-forecasting service 130 may be executed on one or more computing device(s) 210 of any suitable number and type. The demand-forecasting service 130 includes one or more data interfaces 220, an artificial intelligence (AI) analyzer and aggregator 240, and a prediction engine 250. The prediction engine 250 includes machine-learning algorithms or prediction model(s) 252, training data generator 254, model trainer 256, and forecast generator 258. The computing device(s) 210 can include data storage 230 of any suitable type. In some implementations, the data storage 230 may be external to the computing device(s) 210 and accessible over one or more networks.

The data interface(s) 220 may receive e-receipt data 112 for various sources as described in FIG. 1. The e-receipt data 112 is received by the data interface(s) 220 and may be stored in the data storage 230. The data interface(s) 220 support various methods for receiving the e-receipt data 112, including individually in real-time, within a batch file, and/or within a live or real-time stream of data. The data storage 230 may be any suitable type of data storage, such as a cloud service, data warehouse, distributed big data platform, relational and/or non-relational databases, and so forth. The AI analyzer and aggregator 240 may retrieve the e-receipt data 112 from the data storage 230. Alternatively, the AI analyzer and aggregator 240 may receive the e-receipt data 112 from the data interface(s) 220 without intermediate storage of the data in the data storage 230.

The AI analyzer and aggregator 240 may employ an AI algorithm 242 that is trained to recognize relevant data elements of the received e-receipt data 112 in order to identify summary information regarding upcoming shipment volumes. The AI algorithm 242 can be trained to recognize the meaning of words and/or phrases in the received e-receipt data 112 for both labeled and unlabeled fields. For example, the label "item description" in e-receipt data 112 can be recognized by the AI module and used to interpret surrounding textual information to determine a product category for a described item(s).

The AI algorithm 242 may also be trained to recognize abbreviated or differently named fields. For example, the term "s&h" may be interpreted the same as the term "shipping & handling"; the term "shipping speed" may be interpreted the same as the term "shipping option" or "delivery time"; and the terms "2", "2 of +item description", or "unit price X 2" may all be interpreted as representing a quantity (e.g., two) of items in an order. Similarly, differing address formats, such as abbreviated street names, may also be recognized and interpreted by the AI algorithm 242.

The AI algorithm 242 may also be trained to recognize brand names to determine a type(s) of product being delivered. For example, "Best Buy" may indicate that electronics are being delivered whereas "Levi's" may indicate that apparel is being delivered. Similarly, the AI algorithm 242 may be trained to recognize a product description and/or SKU information to determine the exact or approximate dimensions and/or weight of the product(s) to be shipped.

In some implementations, the AI algorithm 242 may apply the Pareto principle (e.g., the 80/20 rule where roughly 80 percent of the effects come from 20 percent of the causes). For example, 20 percent of product descriptions for a specific product in the e-receipt data 112 may be interpreted by the AI algorithm 242 to match 80 percent of the product description across e-receipts of the same product's make and model, SKU, serial number, and so forth.

In some examples, the AI algorithm 242 employed by the AI analyzer and aggregator 240 may not be able to recognize a brand name when processing the e-receipt data. For example, should the brand name field have a value of "Walmart" (which is a retailer that sells multiple types of products) and the description of the product not be sufficiently captured otherwise in the e-receipt data, the AI algorithm 242 may have to look to other information within the e-receipt data to interpret the product description and/or SKU information or to determine the exact or approximate dimensions and weight of the product to be shipped. To process such discrepancies, the AI algorithm 242 can be trained through machine learning with e-receipts from merchants that provide an amount of detail in the description that, for example, meets a threshold value based on configured criteria. Once trained, the AI algorithm 242 may rely on pattern recognition using the detailed descriptions from the training data to draw a correlation(s) with e-receipts with incomplete or missing information, such as in the description or brand name fields. These correlations can increase the accuracy of the AI algorithm 242 in identifying, for example, the description, SKU, dimensions and/or weight of the product(s) that has been or will be shipped.

Moreover, the AI algorithm 242 may be trained with product announcements and/or press releases to use as indicators to more accurately interpret the received e-receipt data 112. Product announcements can be made, for example, during a specific month of the year (e.g. Apple), at an annual user conference (which is typically at a specific week/month of the year), or at a product anniversary date. Product announcements and/or press releases may include information describing, for example, relevant makes and/or models of the product(s), SKUs for the product(s), a serial number(s) of the product(s), an expected date(s) when the products(s) will be available for sale, the specific merchant(s) and store location(s) selling the product(s), and so forth.

In a similar manner, the AI algorithm 242 can be trained with additional indicators to improve the accuracy of interpreting product descriptions. These indicators may include information from social media, such as products' makes and models being discussed by consumers. For example, consumers may discuss when they have made a purchase and/or before making a purchase. Likewise, the number of Facebook or YouTube "Likes" as well as tweets and retweets regarding a product(s) can be employed to train the AI Algorithm to improve the accuracy of interpreting e-receipt data 112. For example, dates and timestamps associated with the social media comments regarding a product can be correlated with dates within e-receipts data 112. Additional indicators can also include web searches regarding, for example, product makes and models and the dates and timestamps associated with searches; web cookies regarding the product makes and models being viewed on, for example, ecommerce websites; TV STB data regarding consumers viewing of a specific ad campaign(s); and credit and debit card data that includes, for example, product descriptions, SKUs, serial numbers.

The trained AI algorithm 242 may use this data to complement insufficiently described or missing parameters from e-receipts data 112. For example, if an e-receipt is dated after or around the expected date when a product is available for sale, but is missing some or all of the product information, the date information can be used by the AI algorithm 242 to determine the product associated with the e-receipt.

Once the AI module has recognized and interpreted the information from the e-receipt 112, the AI analyzer and aggregator 240 aggregates various recognized and/or determined data elements to further identify and summarize the information regarding upcoming shipment volumes. Such aggregated information may be further analyzed by prediction engine 250, as described in detail below, to identify information related to shipment information, such as spikes, dips, and so forth, in the supply chain. This identified shipping information can be used to, for example, reallocate transportation assets, such as trucks, aerial drones, and autonomous vehicles.

As described above, relevant data elements of the received e-receipt data 112 include the information and/or metadata associated with the sales captured within each respective e-receipts 112. This information may include, for example, shipping information (e.g. street, city, state, zip code), information regarding purchased products and/or services (e.g., category and SKU), shipping speed, information regarding ecommerce providers/merchants, and the logistics company used for fulfillment of the respective orders. Aggregated shipping information may include a total quantity of orders being shipped to a specific city, a specific zip code, a specific street, or to a general location for a set shipping speed (e.g. 2-Day Shipping). Further, different shipping speeds for a specific city, a specific zip code, a specific street, or to a general location can be analyzed and aggregated by the AI analyzer and aggregator 240. The shipping information may be employed to determine, for example, a number of resources to allocate in order to manage deliveries at the particular street or general location.

Aggregated information regarding purchased products and/or services may include, for example, a total quantity of orders being shipped within a specific product category or with a specific SKU or group of SKUs at the same shipping speed (e.g. 2-Day Shipping) or different shipping speeds. The aggregated information regarding products and/or services can be employed to, for example, calculate the physical dimensions of shipments in order to determine the number and types of resources to manage deliver of the particular products and/or services.

Aggregated information regarding shipping speed may include a total quantity of orders being shipped at the same shipping speed and/or different shipping speeds. The aggregated information regarding shipping speed can be employed to, for example, calculate the transportation mode (e.g. air, ground, rail, ocean, road, or combination thereof) to plan and manage delivery of the various respective shipments.

Aggregated information regarding ecommerce merchants may include, for example, calculating a total quantity of orders being shipped from a specific ecommerce merchant, such as ecommerce merchant 110 from FIG. 1, and a total amount of shipping and handling fees for each specific ecommerce merchant. The total quantity and total amount can be employed to, for example, offer incentives to the respective ecommerce providers/merchant to use particular services and/or logistics companies for fulfillment. As an example, if 10,000 smart televisions are being delivered to a particular city at a cost of about $500,000 to customers, a logistics company can provide a special discount to the ecommerce merchant to use its services.

Aggregated information regarding the logistics company used for fulfillment of the respective orders may include, for example, calculating a total quantity of orders being shipped using a specific logistics company. The total quantity can be employed to determine a number of resources to allocate in order to accommodate delivery fulfillment for the respective orders.

Implementations provide for a prediction engine 250 that builds a logistics demand forecasting analytics model, which employs one or more machine-learning algorithms 252 to determine the logistic demand forecasting data 132 based on the e-receipt data 112 identified and aggregated by the AI analyzer and aggregator 240. Various machine learning techniques or algorithms may be applied by prediction engine 250 (and by the AI analyzer and aggregator 240 to the AI algorithm 242) including supervised learning, unsupervised learning, and reinforcement learning. A supervised learning algorithm analyzes the training data and produces an inferred function, which can be used for mapping new examples. An unsupervised machine-learning algorithm draws inferences from datasets consisting of input data without labeled responses. A reinforcement-learning algorithm allows for the automatic determination an ideal behavior within a specific context, in order to maximize performance. A supervised learning technique is described in the depicted and following examples; however, any of these three or other techniques may be used to interpret the e-receipt data 112 and to determine the logistic demand forecasting data 132. Once determined, the logistic demand forecasting data 132 may be stored on the computing device(s) 210, and/or elsewhere, and may be transmitted to, for example, one or more automated warehouses 142 for various uses as described in FIG. 1. In the depicted example, training data generator 254 generates training data based on historical and actual demand, which is determined from the internal data 144 that may be received from one or more logistics companies, such as logistics company 140.

Model trainer 254 trains the classifier of the machine-learning algorithms 252 with the determined training data. For example, the classifier may be trained based on real-time (e.g., actual) or periodic (e.g., historical), such as hourly or daily, training data. A classifier is an algorithm that implements classification or a mapping of input data to a category. The classifier may be a particular type of classifier, such as a decision tree, artificial neural network, or SVM. A decision tree classifier organizes a series of test questions and conditions in a tree structure. An algorithm may then navigate through the tree structure (e.g., through the series of questions) until a leaf node is reached. A neural network classifier includes a series of units (neurons), arranged in layers, which convert an input vector into some output. Each unit takes an input, applies a function, such as a non-linear function, to it and then passes the output to the next layer. The networks may be defined to be, for example, feed-forward, such that a unit feeds its output to all the units on the next layer, but no feedback is provided to the previous layer. Weights may be applied to the signals passing from one unit to another. The weights are tuned in the training phase to adapt a neural network to a particular problem at hand (e.g., interpreting e-receipt data or logistics demand forecasting). An SVM is a discriminative classifier with associated learning algorithms that analyze data used for classification and regression analysis. For a given set of training examples, each marked as belonging to one or the other of two categories, an SVM training algorithm builds a model that assigns new examples to one category or the other, making it a non-probabilistic binary linear classifier. Models within an SVM are representations of the training examples as points in space, mapped so that the examples of the separate categories are divided by a clear gap that is as wide as possible. As the model is trained, new examples are mapped and predicted to belong to a category based on which side of the gap they fall.

In the depicted example, forecast generator 258 receives the trained machine-learning algorithms 252 from model trainer 254 trains and generates the logistic demand forecasting data 132 based on the e-receipt data 112 identified and aggregated by the AI analyzer and aggregator 240. For example, a forecast label may be used to represent the personnel headcount or a number of assets that will be needed by a logistics company to handle end-to-end upcoming shipments from pick-up address to delivery address. Variations for the forecast label, such as the specific types of labor (e.g., truck drivers, airplanes pilots, distribution center workers) or the specific types of transportation assets (e.g., trucks, airplanes, ships, railcars, aerial drones, autonomous vehicles), may also be used. Forecast data is generated based on the determined training data. The forecast data is imported into machine-learning algorithm 252, which then determines, for example, the personnel headcount or the amount of transportation assets needed to handle upcoming shipment volume. The forecast data may then be compared to an historical or "true" label to calculate an accuracy score. The accuracy score may be iteratively determined using thousands or millions of rows from the training data and/or forecast data. Rules can be set in the machine-learning algorithm 252 to choose and recommend the forecast data based on, for example, an accuracy score falling within an acceptable margin percentage to the historical data. Additionally, other training and forecast data may be determined from, for example, social media, web searches, web cookies, TV STB data, credit and debit data, ACH data, and so forth. Machine learning can also be applied to adjust pricing per shipment using a similar approach. Implementations, of demand-forecasting service 130 may utilize machine-learning libraries, such as Scikit and TensorFlow.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of a logistic demand forecasting system, such as depicted in FIGS. 1 and 2.

Figure 3:
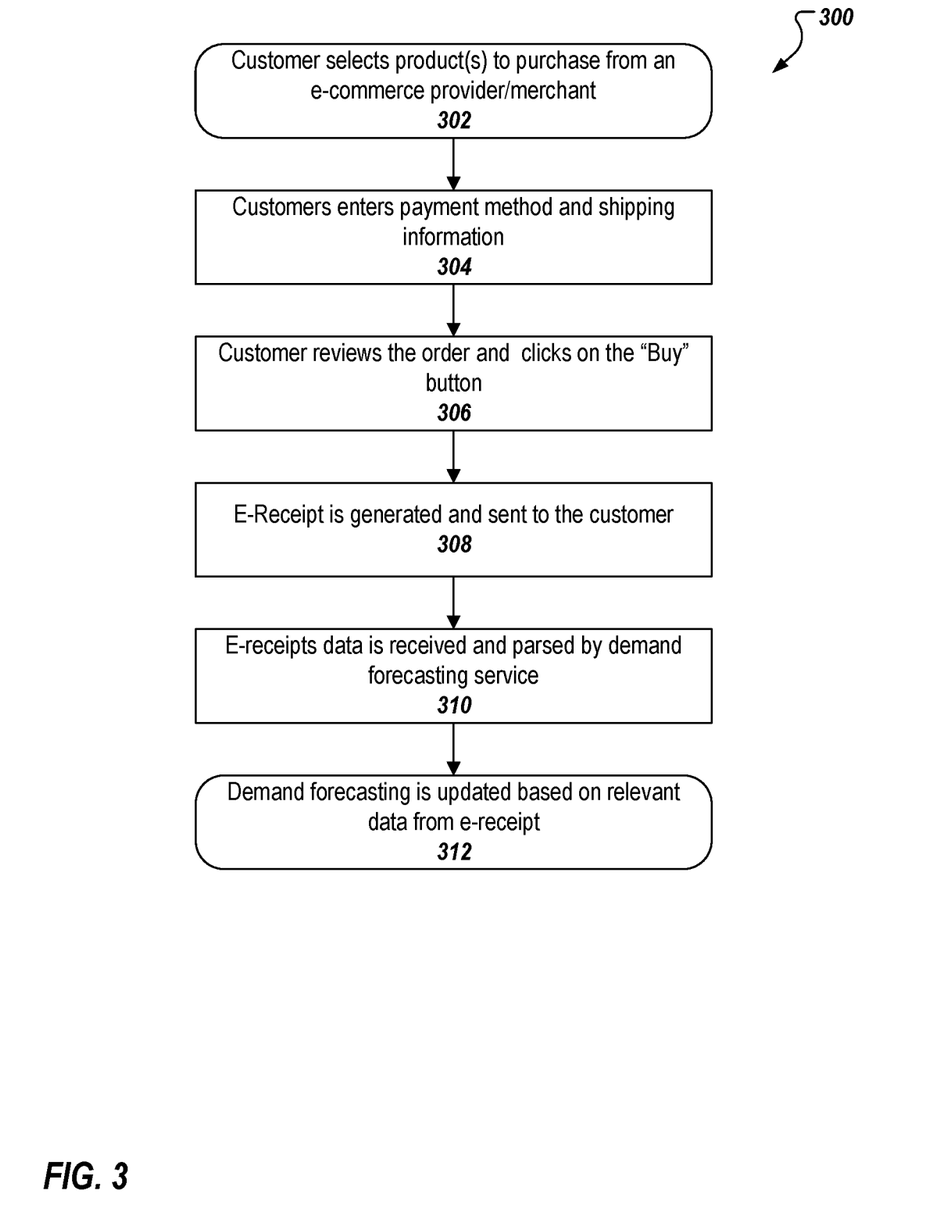
FIG. 3 depicts a flow diagram of an example process for receiving an e-receipt, according to implementations of the present disclosure.

FIG. 3 depicts a flow diagram of an example process (300) for receiving an e-receipt, such as e-receipt 112, according to implementations of the present disclosure. A customer selects (302) product(s) to purchase on an ecommerce merchant website (or native mobile app, mobile web). The customer chooses (304) a payment method (e.g., debit card, credit card, checking account) and enters, for example, a delivery/shipping address, a desired delivery time (e.g. at 8 pm) or time window (e.g. between 8 pm and 10 pm), additional delivery/shipping addresses (in case the customer is unable to accept delivery at the first address), a delivery frequency (e.g., if the product(s) is to be shipped on a regular basis), an email address, a mobile phone number, and/or other relevant information for a logistics company. The customer reviews (306) the order details and then clicks on the "Buy" button. The ecommerce website generates and sends (308) an e-receipt that includes the order details. The e-receipt data is received and parsed (310) by demand-forecasting service, such as demand-forecasting service 130 from FIG. 1, from the customer's email service provider. Demand forecasting for a respective logistics company is updated (312) by the demand-forecasting service based on relevant data from e-receipt.

Figure 4:
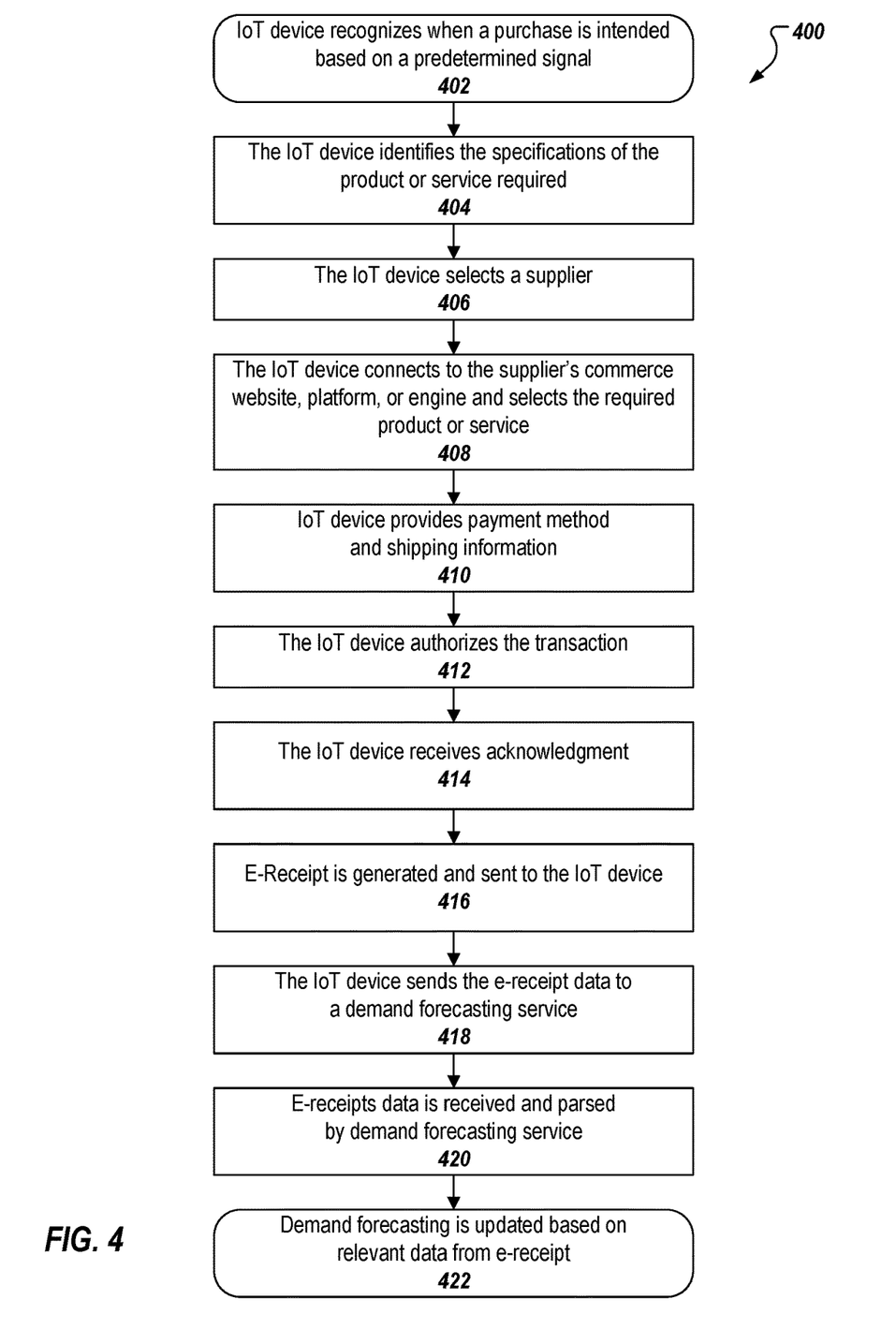
FIG. 4 depicts a flow diagram of another example process for receiving an e-receipt, according to implementations of the present disclosure.

FIG. 4 depicts a flow diagram of an example process (400) for receiving an e-receipt, according to implementations of the present disclosure. An IoT device recognizes (402) when a purchase is intended based on a predetermined signal. The IoT device identifies (404) the specifications of the product or service required. The IoT device selects (406) a supplier from a list of suppliers or based on a predetermined supplier per pre-set requirements. The IoT device connects (408) to the supplier's commerce website, platform, or engine and selects the required product or service. The IoT device provides (410) a predetermined payment method (e.g., debit, credit, checking account, and so forth) and enters, for example, a delivery/shipping address, a desired delivery time (e.g. at 8 pm) or time window (e.g. between 8 pm and 10 pm), additional delivery/shipping addresses (in case the customer is unable to accept delivery at the first address), a delivery frequency (e.g., if the product(s) is to be shipped on a regular basis), an email address, a mobile phone number, and/or other relevant information for a logistics company. The IoT device authorizes (412) the transaction. The IoT device receives (414) acknowledgment that payment has been confirmed by the supplier's commerce platforms/websites/engines. The ecommerce website generates and sends (416) an e-receipt that includes the order details. The IoT device sends (418) the e-receipt data to a demand-forecasting service, such as demand-forecasting service 130 from FIG. 1. The e-receipt data is received and parsed (420) by the demand-forecasting service. Demand forecasting for a respective logistics company is updated (422) by the demand-forecasting service based on relevant data from the e-receipt.

Figure 5:
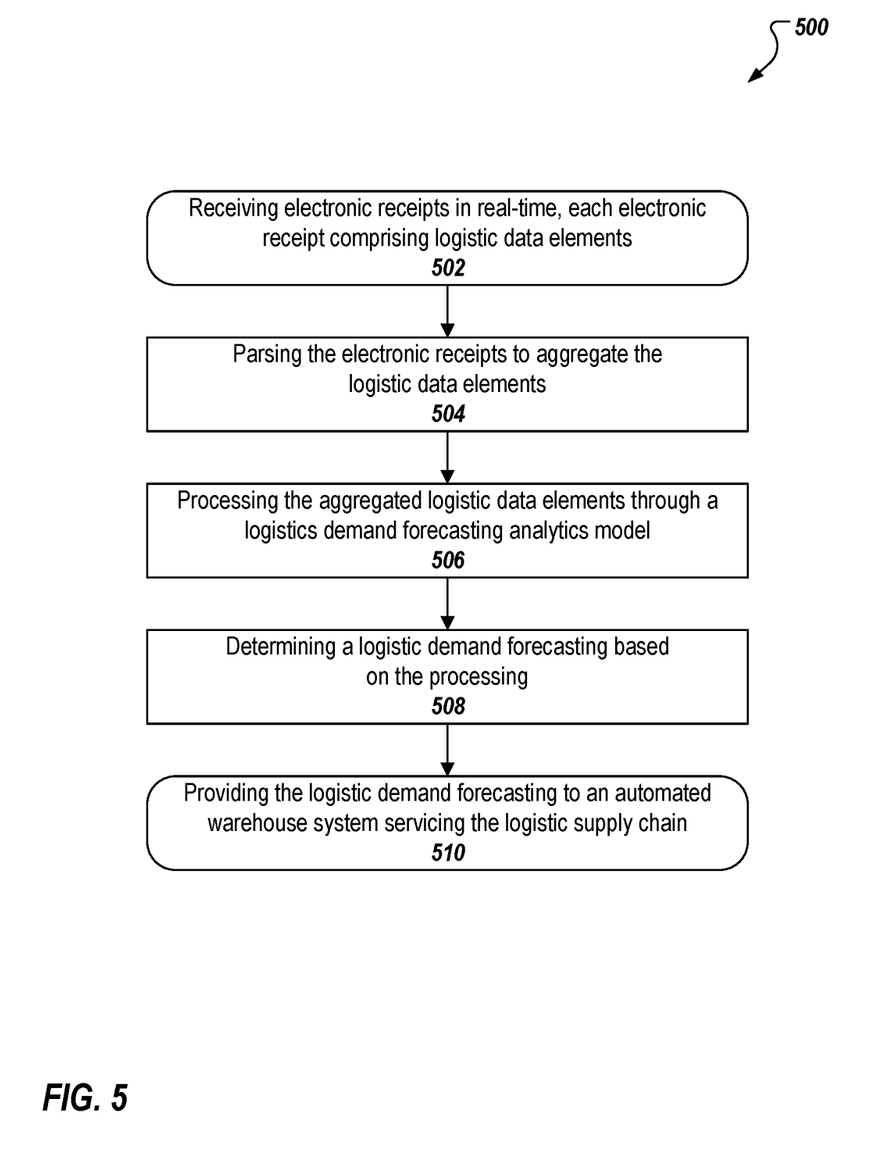
FIG. 5 depicts a flow diagram of an example process for providing a logistic demand forecasting, according to implementations of the present disclosure.

FIG. 5 depicts a flow diagram of an example process (500) for providing a logistic demand forecasting, according to implementations of the present disclosure. Operations of the process can be performed by the demand-forecasting service 130, AI analyzer/aggregator 240, prediction engine 250, and/or other software module(s) executing on the computing device(s) 210 or elsewhere by one or more processors.

The computing device receives (502) a plurality of electronic receipts, each including a plurality of logistic data elements, in real-time, near real-time, or periodically. The computing device parses (504) the electronic receipts to aggregate the logistic data elements. The computing device processes (506) the aggregated logistic data elements through a logistics demand forecasting analytics model. In some implementations, the logistics demand forecasting analytics model is trained using a set of training data that describes an historic or actual demand within a logistic supply chain. The computing device determines (508) a logistic demand forecasting, indicating an upcoming demand for transportation assets within the logistic supply chain, based on the processing. The computing device provides (510) the logistic demand forecasting to an automated warehouse system, such as automated warehouse 142, servicing the logistic supply chain and the process ends.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, Application Programming Interface (API) or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing a logistic demand forecasting, the method being executed by one or more processors and comprising:
   receiving, by the one or more processors, a plurality of electronic receipts (e-receipts), each e-receipt comprising a plurality of logistic data elements, each e-receipt representing a transaction comprising an item that is to be delivered to a customer and a location of the customer;
   parsing, by the one or more processors, the e-receipts to aggregate the logistic data elements, the e-receipts being aggregated prior to shipping of items represented in the plurality of e-receipts and based on respective locations of multiple customers represented in respective e-receipts to at least partially provide aggregated logistic data elements comprising aggregated shipping information indicating a general location for shipping the items;
   processing, by the one or more processors, the aggregated logistic data elements through a logistics demand forecasting analytics model to output a logistic demand forecasting, the logistics demand forecasting analytics model having been trained using a set of training data describing historic and actual demand within a logistic supply chain, the logistics demand forecasting comprising a personnel headcount and transportation assets to handle delivery of the items represented in the plurality of e-receipts to the respective locations; and
   providing, by the one or more processors, the logistic demand forecasting to an automated warehouse system servicing the logistic supply chain.

2. The computer-implemented method of claim 1, wherein the e-receipts are received from an electronic mail provider or a cross-platform messaging provider.

3. The computer-implemented method of claim 1, wherein the e-receipts are received from an Internet of Things (IoT) device.

4. The computer-implemented method of claim 3, wherein bidirectional communication is established for the IoT device.

5. The computer-implemented method of claim 1, wherein the e-receipts are received from a short message service (SMS) provider.

6. The computer-implemented method of claim 1, wherein the logistic demand forecasting is determined based on data received from a social media provider, a web search provider, a television set top box data provider, a credit and debit provider, data aggregator and services provider, or an Automated Clearing House (ACH) data provider.

7. The computer-implemented method of claim 1, wherein the logistics demand forecasting analytics model is trained with a decision tree classifier.

8. The computer-implemented method of claim 1, wherein the set of training data includes product announcements, social media posts, web searches, or web cookies.

9. The computer-implemented method of claim 1, wherein the transportation assets includes trucks, airplanes, ships, railcars, aerial drones, or autonomous vehicles.

10. The computer-implemented method of claim 1, wherein the e-receipts are received in real-time, near real-time, or periodically.

11. One or more non-transitory computer-readable storage media coupled to one or more processors and having instructions stored thereon which, when executed by the one or more processors, cause the one or more processors to perform operations for providing a logistic demand forecasting, the operations comprising:
   receiving, by the one or more processors, a plurality of electronic receipts (e-receipts), each e-receipt comprising a plurality of logistic data elements, each e-receipt representing a transaction comprising an item that is to be delivered to a customer and a location of the customer;
   parsing, by the one or more processors, the e-receipts to aggregate the logistic data elements, the e-receipts being aggregated prior to shipping of items represented in the plurality of e-receipts and based on respective locations of multiple customers represented in respective e-receipts to at least partially provide aggregated logistic data elements comprising aggregated shipping information indicating a general location for shipping the items;
   processing, by the one or more processors, the aggregated logistic data elements through a logistics demand forecasting analytics model to output a logistic demand forecasting, the logistics demand forecasting analytics model having been trained using a set of training data describing historic and actual demand within a logistic supply chain, the logistics demand forecasting comprising a personnel headcount and transportation assets to handle delivery of the items represented in the plurality of e-receipts to the respective locations analytics model is trained with a supervised machine learning algorithm;
   providing, by the one or more processors, the logistic demand forecasting to an automated warehouse system servicing the logistic supply chain.

12. The computer-readable storage media of claim 11, wherein the logistics demand forecasting analytics model is trained with a decision tree classifier, a neural network classifier, or a support vector machine (SVM) classifier.

13. The computer-readable storage media of claim 12, wherein the e-receipts are received in real-time, near real-time, or periodically.

14. A system, comprising:

one or more processors; and a computer-readable storage device coupled to the one or more processors and having instructions stored thereon which, when executed by the one or more processors, cause the one or more processors to perform operations for providing a logistic demand forecasting, the operations comprising:

receiving, by the one or more processors, a plurality of electronic receipts (e-receipts), each e-receipt comprising a plurality of logistic data elements, each e-receipt representing a transaction comprising an item that is to be delivered to a customer and a location of the customer;

parsing, by the one or more processors, the e-receipts to aggregate the logistic data elements, the e-receipts being aggregated prior to shipping of items represented in the plurality of e-receipts and based on respective locations of multiple customers represented in respective e-receipts to at least partially provide aggregated logistic data elements comprising aggregated shipping information indicating a general location for shipping the items;

processing, by the one or more processors, the aggregated logistic data elements through a logistics demand forecasting analytics model to output a logistic demand forecasting, the logistics demand forecasting analytics model having been trained using a set of training data describing historic and actual demand within a logistic supply chain, the logistics demand forecasting comprising a personnel headcount and transportation assets to handle delivery of the items represented in the plurality of e-receipts to the respective locations; and providing, by the one or more processors, the logistic demand forecasting to an automated warehouse system servicing the logistic supply chain.

15. The system of claim 14, wherein the logistic demand forecasting is determined based on data received from a social media provider, a web search provider, a television set top box data provider, a credit and debit provider, data aggregator and services provider, or an Automated Clearing House (ACH) data provider.

16. The system of claim 14, wherein the e-receipts are received from an electronic mail provider, a cross-platform messaging provider, or an Internet of Things (IoT) device.

17. The system of claim 14, wherein the logistics demand forecasting analytics model is trained with a decision tree classifier, a neural network classifier, or a support vector machine (SVM) classifier.

* * * * *

UNITED STATES PATENT AND TRADEMARK OFFICE
CERTIFICATE OF CORRECTION

PATENT NO. : 11,468,457 B2
APPLICATION NO. : 15/933743
DATED : October 11, 2022
INVENTOR(S) : Diegane Dione It is certified that error appears in the above-identified patent and that said Letters Patent is hereby corrected as shown below:

In the Claims

Claim 11, Column 16, Lines 55-57, delete "locations analytics model is trained with a supervised machine learning algorithm;" and insert -- locations; and --.

Signed and Sealed this
Twentieth Day of February, 2024

Katherine Kelly Vidal
Director of the United States Patent and Trademark Office